United States Patent
Nagano

(10) Patent No.: US 9,749,527 B2
(45) Date of Patent: Aug. 29, 2017

(54) LENS BARREL AND CAMERA SYSTEM

(71) Applicant: CANON KABUSHIKI KAISHA, Tokyo (JP)

(72) Inventor: Toshimune Nagano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 14/619,252

(22) Filed: Feb. 11, 2015

(65) Prior Publication Data
US 2015/0234147 A1 Aug. 20, 2015

(30) Foreign Application Priority Data
Feb. 19, 2014 (JP) .................. 2014-029467

(51) Int. Cl.
| | |
|---|---|
| *H04N 5/232* | (2006.01) |
| *G03B 3/10* | (2006.01) |
| *G03B 5/00* | (2006.01) |
| *G02B 7/08* | (2006.01) |
| *G02B 7/10* | (2006.01) |

(52) U.S. Cl.
CPC ........... *H04N 5/23241* (2013.01); *G03B 3/10* (2013.01); *G03B 5/00* (2013.01); *G02B 7/08* (2013.01); *G02B 7/102* (2013.01); *G03B 2205/0053* (2013.01)

(58) Field of Classification Search
CPC .. G03B 2217/007; G03B 13/32; G03B 13/34; G03B 3/00; G03B 3/10; G03B 5/00; G03B 2205/0053; G02B 7/0408; G02B 7/09; G02B 7/10; G02B 7/102; H04N 5/2251; H04N 5/2254; H04N 5/23241

USPC ....................................................... 348/357
See application file for complete search history.

(56) References Cited

U.S. PATENT DOCUMENTS

| | | | |
|---|---|---|---|
| 5,172,149 A | 12/1992 | Sekiguchi et al. | |
| 6,937,285 B2* | 8/2005 | Ohkawara | G02B 7/102 348/351 |
| 7,071,973 B1* | 7/2006 | Yoshioka | H04N 5/2253 348/219.1 |
| 7,149,421 B2* | 12/2006 | Ohkawara | G02B 7/102 396/129 |

(Continued)

FOREIGN PATENT DOCUMENTS

| | | |
|---|---|---|
| JP | 04-027906 A | 1/1992 |
| JP | 2004-302068 A | 10/2004 |

(Continued)

*Primary Examiner* — Pritham Prabhakher
(74) *Attorney, Agent, or Firm* — Rossi, Kimms & McDowell LLP

(57) ABSTRACT

A lens barrel includes a lens, a rotatable operation member, a rotation amount detector configured to detect a rotation amount of the operation member, an operation detector configured to detect a rotational operation of the operation member, the operation detector having a mechanism that is different from a mechanism of the rotation amount detector, and a controller configured to perform drive control of the lens depending on rotation of the operation member, and the controller is capable of operating the lens barrel in a first mode in which the rotation amount detector is used and a second mode in which the operation detector is used, and power consumption required in the second mode is less than power consumption required in the first mode.

17 Claims, 13 Drawing Sheets

(56) References Cited

U.S. PATENT DOCUMENTS

| | | | | |
|---|---|---|---|---|
| 8,311,405 | B2* | 11/2012 | Hirano | G02B 7/102 348/240.3 |
| 9,426,366 | B2* | 8/2016 | Park | H04N 5/23241 |
| 2004/0008422 | A1* | 1/2004 | Ohkawara | G02B 7/102 359/698 |
| 2005/0249489 | A1* | 11/2005 | Ohkawara | G02B 7/102 396/131 |
| 2008/0106616 | A1* | 5/2008 | Nagata | G03B 17/12 348/231.99 |
| 2008/0199170 | A1* | 8/2008 | Shibuno | G03B 13/36 396/125 |
| 2012/0327274 | A1* | 12/2012 | Taguchi | H04N 5/232 348/240.2 |
| 2014/0307161 | A1* | 10/2014 | Park | H04N 5/23241 348/372 |

FOREIGN PATENT DOCUMENTS

| | | |
|---|---|---|
| JP | 2009-186545 A | 8/2009 |
| JP | 2012-141573 A | 7/2012 |

\* cited by examiner

LENS BARREL AND CAMERA SYSTEM

BACKGROUND OF THE INVENTION

Field of the Invention

The present invention relates to a lens barrel that is capable of setting a low-power consumption mode.

Description of the Related Art

Recently, a lens barrel that detects a rotation amount of an operation ring by a manual operation and that has a power zoom or power focus configuration that uses a drive source such as a motor to drive a lens has been known. Japanese Patent Laid-open No. 4-27906 discloses a configuration in which a rotation amount of an operation ring is detected by using a rotation amount detector that includes a photosensor such as a photo interrupter and a light shielding part on which a slit is formed.

On the other hand, a camera that is set to a low-power consumption mode when a camera operation is not performed within a certain period of time is known. When the camera is set to the low-power consumption mode, the power supply from the camera to the lens barrel is stopped and the lens barrel is also changed to the low-power consumption mode. In this case, when the operation is performed via the camera, the low-power consumption mode returns to a normal shooting mode. However, even when the operation ring of the lens barrel is operated in the low-power consumption mode, the lens cannot be driven. Japanese Patent Laid-open No. 2009-186545 discloses a configuration in which the low-power consumption mode is terminated by using a switch unit of an interchangeable lens.

However, even in the configuration disclosed in Japanese Patent Laid-open No. 2009-186545, the lens cannot be driven when a user rotationally operates the operation ring before operating the switch unit of the interchangeable lens.

SUMMARY OF THE INVENTION

The present invention provides a lens barrel and a camera system that are capable of detecting a rotational operation of an operation ring in a low-power consumption mode.

A lens barrel as one aspect of the present invention includes a lens, a rotatable operation member, a rotation amount detector configured to detect a rotation amount of the operation member, an operation detector configured to detect a rotational operation of the operation member, the operation detector having a mechanism that is different from a mechanism of the rotation amount detector, and a controller configured to perform drive control of the lens depending on rotation of the operation member, and the controller is capable of operating the lens barrel in a first mode in which the rotation amount detector is used and a second mode in which the operation detector is used, and power consumption required in the second mode is less than power consumption required in the first mode.

A camera system as another aspect of the present invention includes the lens barrel and a camera including an image pickup element.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

[Embodiment 1]

Figure 1:
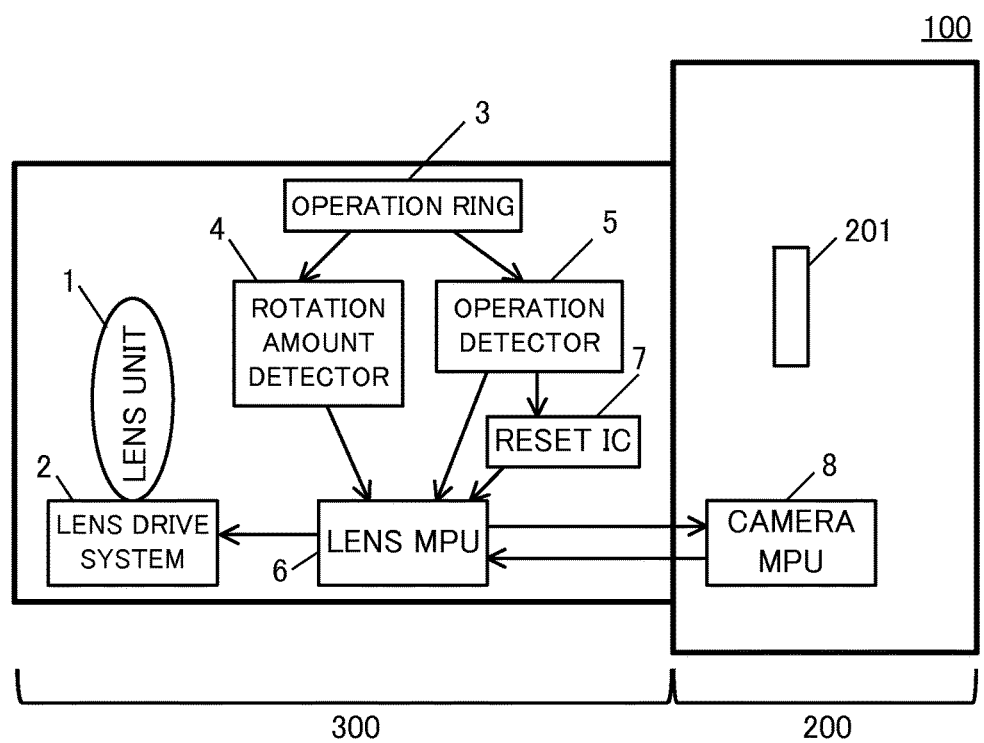
FIG. 1 is a block diagram of illustrating an outline configuration of a camera system that includes a lens barrel in each embodiment.

First of all, referring to FIG. 1, an outline configuration of a camera system including a lens barrel in Embodiment 1 of the present invention will be described. FIG. 1 is a block diagram of illustrating the outline configuration of a camera system 100 in this embodiment. As illustrated in FIG. 1, the camera system 100 (image pickup system) includes a camera 200 (image pickup apparatus) and a lens barrel 300 (lens apparatus). The lens barrel 300 of this embodiment is removably attached to the camera 200.

In the lens barrel 300, reference numeral 1 denotes a lens unit (image pickup optical system). The lens unit 1 includes a plurality of lenses, an aperture stop, and the like. Reference numeral 2 denotes a lens drive system. The lens drive system 2 includes a lens drive unit that drives at least one lens of the plurality of lenses, an aperture stop unit that drives the aperture stop, and the like. The lens drive system 2, for example, drives the lens so as to move in an optical axis direction. Reference numeral 3 denotes an operation ring (operation member). The operation ring 3 is rotatable and is capable of driving the lens drive system 2 by a rotational operation. Reference numeral 4 denotes a rotation amount detector. The rotation amount detector 4 detects a rotation amount (rotation angle or displacement) of the operation ring 3. In this embodiment, the rotation amount detector 4 operates in a normal shooting mode (first mode). Reference numeral 5 denotes an operation detector. The operation detector 5 detects a rotational operation (start of rotational operation) of the operation ring 3. In this embodiment, the operation detector 5 operates in a low-power consumption mode or standby mode (second mode). The operation detector 5 requires power consumption less than that of the rotation amount detector 4.

Reference numeral 6 denotes a lens MPU (controller). The lens MPU 6 controls states of the rotation amount detector 4, the operation detector 5, and the lens barrel 300, and is capable of communicating with the camera 200. Furthermore, the lens MPU 6 performs drive control of the lens (lens unit 1) depending on rotation of the operation ring 3. The lens MPU 6 is capable of setting the first mode (normal shooting mode) and the second mode (low-power consumption mode) that requires power less than that in the first mode. If needed, the lens MPU 6 may be configured to set another mode that is different from each of the normal shooting mode and the low-power consumption mode.

Reference numeral 7 denotes a reset IC (setting portion). The reset IC 7 processes a signal output from the operation detector 5 and sends the processed signal to the lens MPU 6. Reference numeral 8 denotes a camera MPU (controller). The camera MPU 8 is provided in the camera 200, and is capable of communicating with the lens MPU 6. In addition, the camera MPU 8 is capable of switching a mode of the camera 200 to the low-power consumption mode (setting the mode to the low-power consumption mode). The camera 200 includes an image pickup element 201. The image pickup element 201 includes a photoelectric conversion element such as a CCD sensor, and photoelectrically converts an object image (optical image) formed via the lens unit 1.

Figure 2:
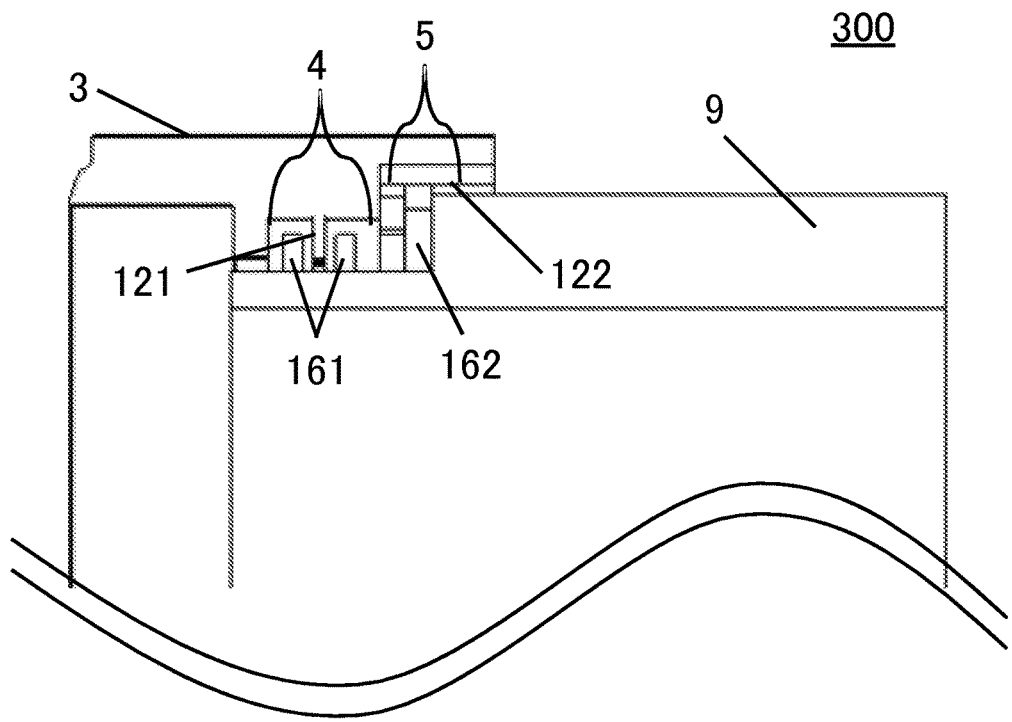
FIG. 2 is a diagram of illustrating a main structure of the lens barrel in each embodiment.

Subsequently, referring to FIG. 2, a main structure of the lens barrel 300 will be described. FIG. 2 is a diagram of illustrating the main structure of the lens barrel 300. In FIG. 2, reference numeral 9 denotes a fixed cylinder (fixed member). The operation ring 3 is provided outside the fixed cylinder 9. The rotation amount detector 4 and the operation detector 5 are provided between the operation ring 3 and the fixed cylinder 9. The rotation amount detector 4 includes a comb teeth part 121 and a photo interrupter 161 (photosensor) and detects the rotation amount of the operation ring 3. The operation detector 5 includes a concave-convex part 122 (concavo-convex part, protrusions, or recesses) and a micro switch 162 and detects start of the rotational operation of the operation ring 3.

Figure 3:
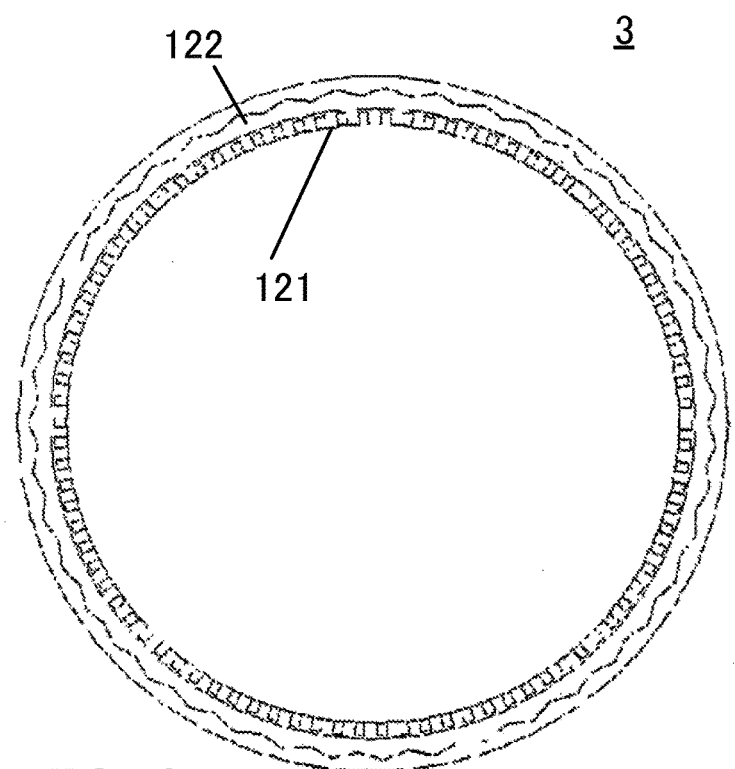
FIG. 3 is a diagram of illustrating a structure of an operation ring in each embodiment.

FIG. 3 is a diagram of illustrating the structure of the operation ring 3. As illustrated in FIG. 3, the operation ring 3 includes the comb teeth part 121 that is used to detect the rotation amount of the operation ring 3 and the concave-convex part 122 that is used to detect the start of the rotational operation of the operation ring 3.

Figure 4:
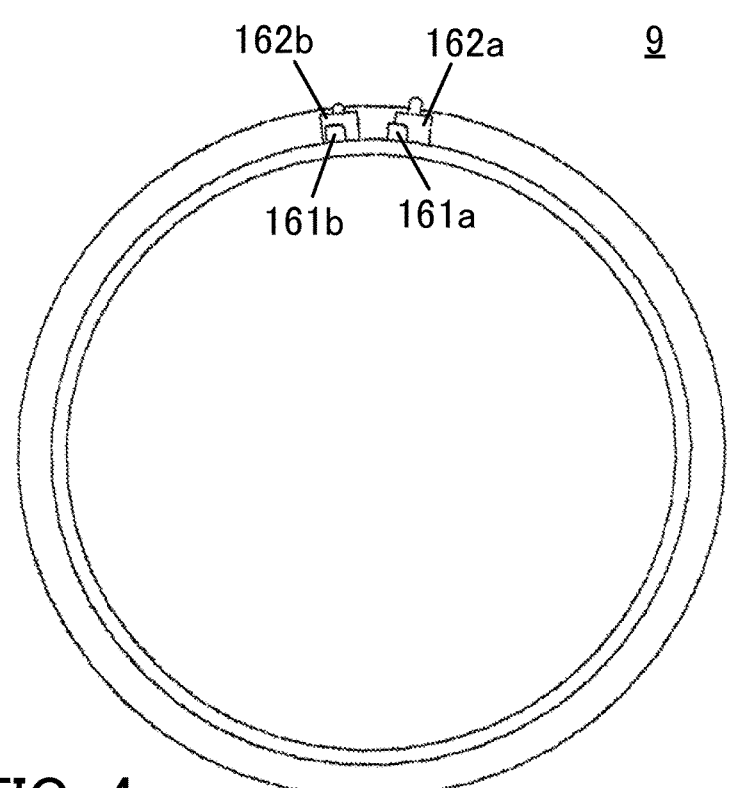
FIG. 4 is a diagram of illustrating a structure of a fixed cylinder in each embodiment.

FIG. 4 is a diagram of illustrating the structure of the fixed cylinder 9. As illustrated in FIG. 4, the fixed cylinder 9 includes two photo interrupters 161a and 161b that are used to detect the rotation amount of the rotation ring 3 and two micro switches 162a and 162b that are used to detect the start of the rotational operation of the operation ring 3.

Figure 5:
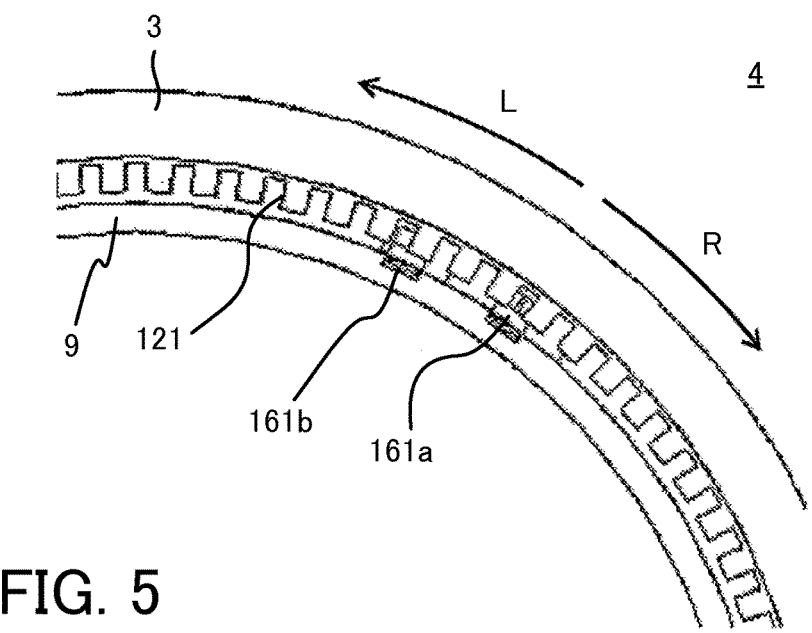
FIG. 5 is a diagram of illustrating a structure of a rotation amount detector in each embodiment.

FIG. 5 is a diagram of illustrating the structure of the rotation amount detector 4. As illustrated in FIG. 5, the rotation amount detector 4 includes the two photo interrupters 161a and 161b that are provided on the fixed cylinder 9 and the comb teeth part 121 that is provided on the operation ring 3. When the operation ring 3 is rotated (displaced in a rightward (R direction) or a leftward (L direction)), the comb teeth part 121 rotates according to the rotation of the rotation ring 3. In accordance with the rotation of the comb teeth part 121, a slit part and a light shielding part of the comb teeth part 121 passes between a light emitting part and a light receiving part of each of the photo interrupters 161a and 161b. Therefore, the light receiving part of each of the photo interrupters 161a and 161b has states in which the light from the light emitting part of the corresponding photo interrupters 161a and 161b can be detected and cannot be detected. The rotation amount detector 4 is capable of obtaining these states as signals.

Figure 6A:
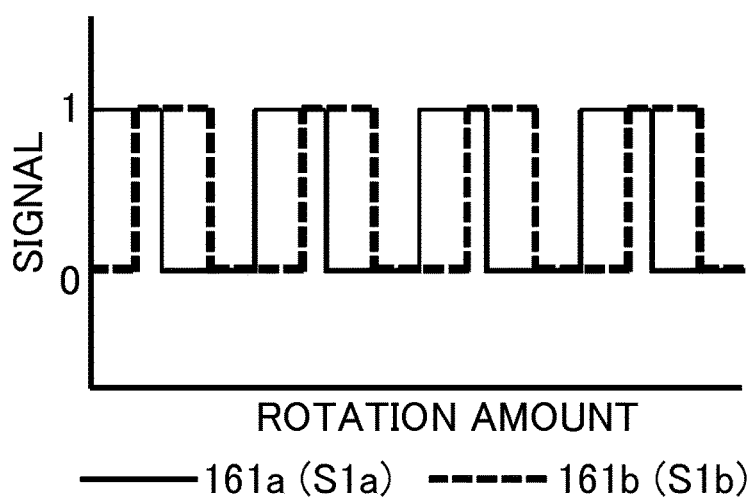
FIGS. 6A and 6B are diagrams of describing an output signal from the rotation amount detector in each embodiment.
Figure 6B:
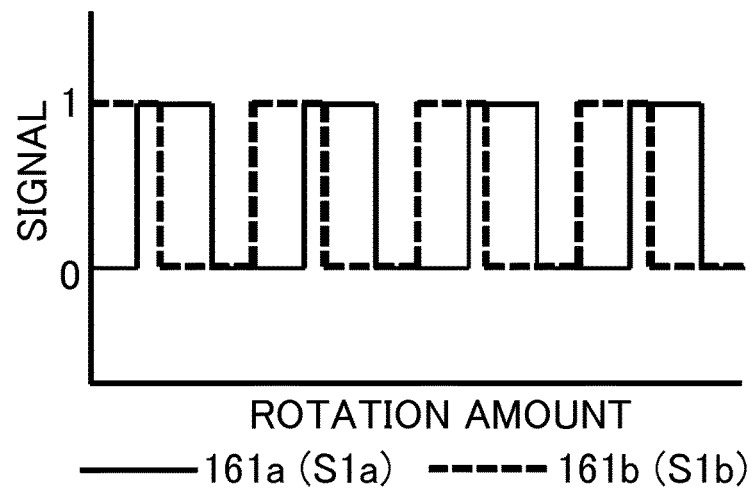

FIGS. 6A and 6B are diagrams of describing signals (output signals of the rotation detector 4) obtained from the two photo interrupters 161a and 161b (photosensors) when the rotation ring 3 is rotated. The horizontal axis and the vertical axis in each of FIGS. 6A and 6B indicate a rotation amount and signals (S1a and S1b) output from the photo interrupters 161a and 161b. FIG. 6A illustrates the signals output when the rotation ring 3 is rotated in the L direction (first direction), and FIG. 6B illustrates the signals output when the rotation ring 3 is rotated in the R direction (second direction). As illustrated in FIG. 6A, when the rotation ring 3 is rotated in the L direction, the signals (Sa and Sb) output from the photo interrupters 161a and 161b change (1,0), (1,1), (0,1), (0,0), (1,0), . . . in this order. On the other hand, as illustrated in FIG. 6B, when the rotation ring 3 is rotated in the R direction, the signals (Sa and Sb) change (1,0), (0,0), (0,1), (1,1), (1,0), . . . in this order. Accordingly, the rotation amount detector 4 is capable of digitally detecting the rotation direction and the rotation amount of the rotation ring 3.

Figure 7:
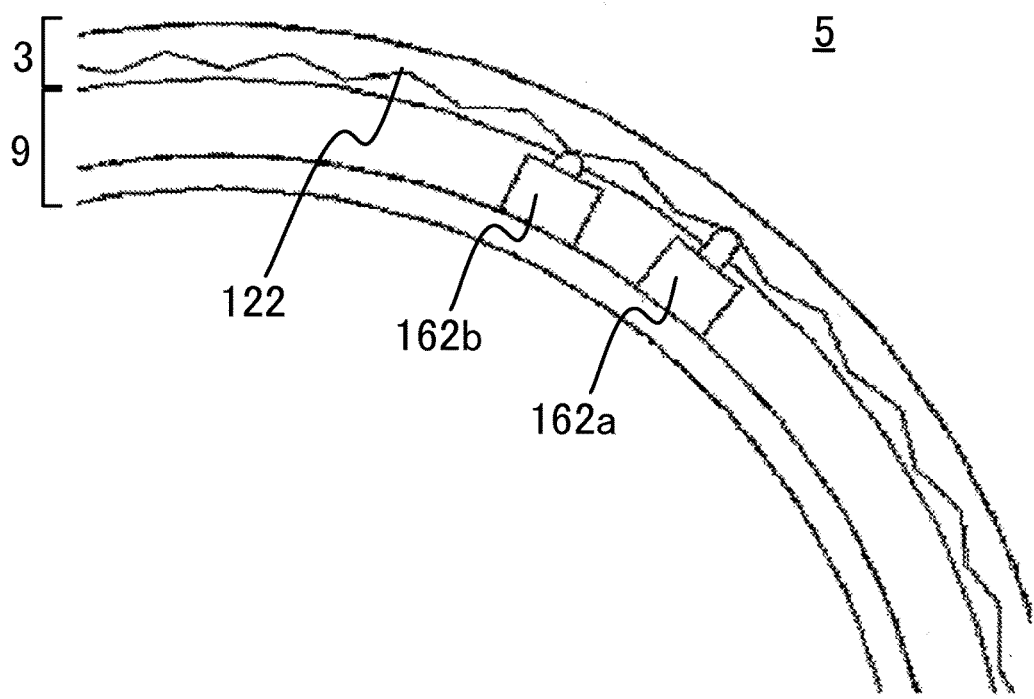
FIG. 7 is a diagram of illustrating a structure of an operation detector in Embodiment 1.

FIG. 7 is a diagram of illustrating the structure of the operation detector 5. The operation detector 5 includes two micro switches 162a and 162b that are provided on the fixed member 9 and a concave-convex part 122 (concavo-convex part, protrusions, or recesses) that is provided on the operation ring 3. In this embodiment, the micro switches 162a and 162b are push-button switches. When a convex part of each of the micro switches 162a and 162b is pushed by the concave-convex part 122, each of the micro switches 162a and 162b is changed to an ON state and the current flows. When the rotation ring 3 is rotated, the concave-convex part 122 provided on the operation ring 3 rotates accordingly. The convex part of each of the micro switches 162a and 162b is pushed by the concave-convex part 122 according to the rotation of the concave-convex part 122. Therefore, the ON state and the OFF state of each of the micro switches 162a and 162b are switched. Accordingly, the operation detector 5 is capable of obtaining these states as signals.

Figure 8:
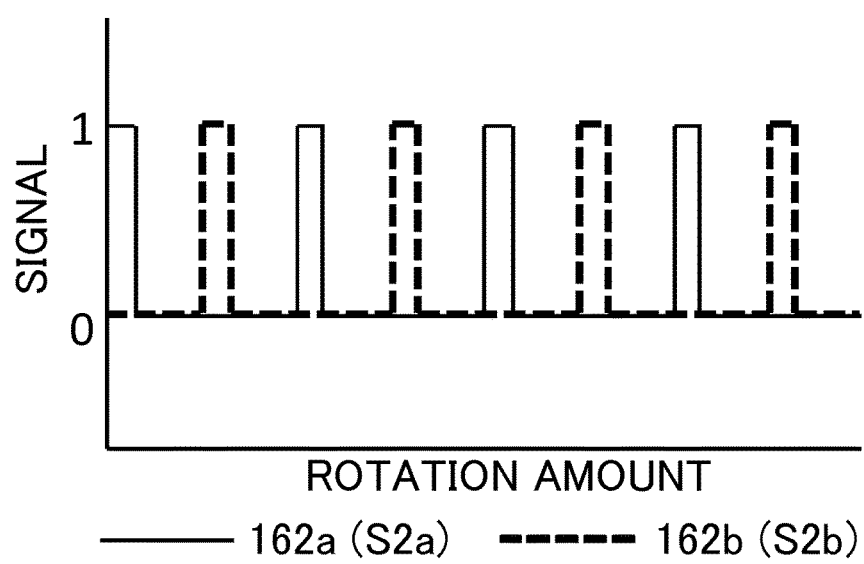
FIG. 8 is a diagram of describing an output signal from the operation detector in each embodiment.

FIG. 8 is a diagram of describing signals (S2a and S2b) output from the operation detector 5 (micro switches 162a and 162b) when the operation ring 3 is rotated. In FIG. 8, the horizontal axis and the vertical axis in FIG. 8 indicate the rotation amount of the operation ring 3 and the signals output from the micro switches 162a and 162b, respectively. As illustrated in FIG. 8, when the signal S2a output from the micro switch 162a is 1, the signal S2b output from the micro switch 162b is 0. On the other hand, when the signal S2b output from the micro switch 162b is 1, the signal S2a output from the micro switch 162a is 0. Thus, both of the signals (S2a and S2b) output from the two micro switches 162a and 162b do not become 1 at the same time. In addition, since it is enough to be obtain these signals, low resolution is acceptable compared to the rotation amount detector 4 and thus the micro switches 162a and 162b can be easily assembled.

Figure 9:
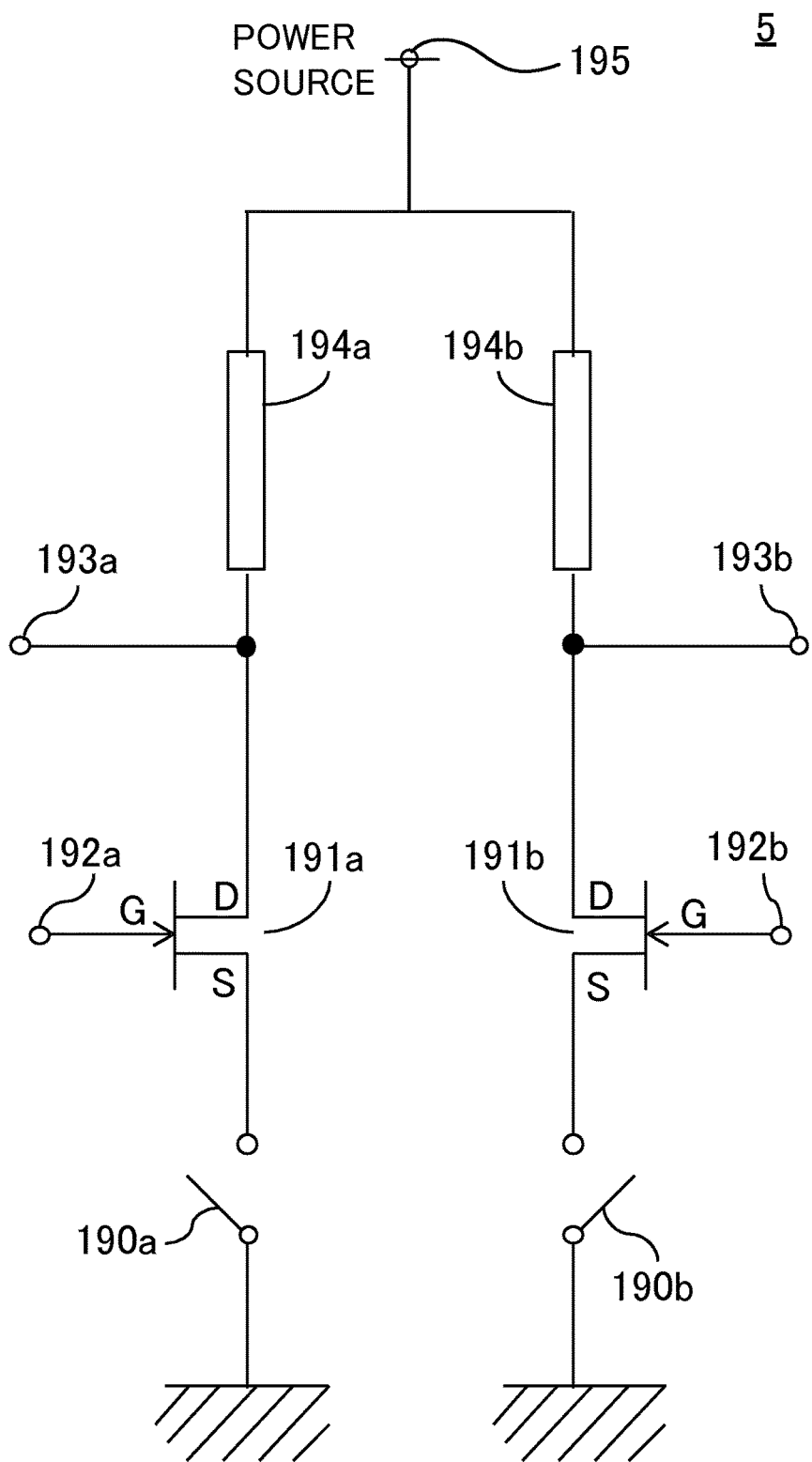
FIG. 9 is an electric circuit diagram of the operation detector in Embodiment 1.

FIG. 9 is an electric circuit diagram of the operation detector 5, and illustrates an electric connection between the micro switches 162a and 162b of the operation detector 5 and the lens MPU 6. The electric circuit of FIG. 9 includes switches 190a and 190b, field effect transistors (FETs) 191a and 191b, resistors 194a and 194b, and terminals 192a, 192b, 193a, 193b, and 195. The switches 190a and 190b illustrated in FIG. 9 correspond to the micro switches 162a and 162b of the operation detector 5, respectively. The terminals 192a and 192b are connected to an output terminal (OUT terminal) of the lens MPU 6. The terminals 193a and 193b are connected to an input terminal (IN terminal) of the lens MPU 6 and the reset IC 7, respectively. The terminal 195 is connected to a power source.

The lens MPU 6 switches, via its output terminal (OUT terminal), a voltage that is applied to the terminal 192a between H (High) level and L (Low) level. As a result, according to characteristics of the FET 191a, the conduction state between the drain (D) and the source (S) of the FET 191a (between D-S) can be controlled. When the lens MPU 6 applies the H-level voltage to the terminal 192a, the conduction state between D-S of the FET 191a is in the conduction state (state where the current flows). On the other hand, when the lens MPU 6 applies the L-level voltage to the terminal 192a, the conduction state between D-S of the FET 191a is in a non-conduction state (state where the current does not flow).

When the lens MPU 6 applies the L-level voltage to the terminal 192a or the switch 190a (micro switch 162a) is OFF, the voltage drop by the resistor 194a does not occur. Therefore, the voltage at the terminal 193a, i.e. the voltage at the input terminal (IN terminal) of the lens MPU 6, is at the H level. On the other hand, when the lens MPU 6 applies the H-level voltage to the terminal 192a and the switch 190a is ON, the voltage drop by the resistor 194a occurs. Therefore, the voltage at the terminal 193a, i.e. the voltage at the input terminal (IN terminal) of the lens MPU 6, is at the L level. The electric circuit containing the switch 190b, the FET 191b, the terminals 192b and 193b, and the resistor 194b operates similarly to the electric circuit containing the switch 190a, the FET 191a, the terminals 192a and 193a, and the resistor 194a described above.

In this configuration, the operation detector 5 is capable of detecting the ON and OFF states of the switches 190a and 190b (micro switches 162a and 162b) selectively. Thus, since the switch that does not consume power (switch that requires low-power consumption) can be used when the lens barrel 300 is set to the low-power consumption mode, the rotational operation of the operation ring 3 can be detected in the state of the low-power consumption mode.

Subsequently, a process that is performed by the reset IC 7 of the lens barrel 300 will be described. As described above, the reset IC 7 receives a pair of signals (S3a and S3b) from the terminals 193a and 193b illustrated in FIG. 9. The reset IC 7 outputs a signal Sr to the input terminal (IN terminal) of the lens MPU 6 based on the signals (S3a and S3b) received from the terminals 193a and 193b. When both of the signals (S3a and S3b) are high levels (H,H), the reset IC 7 outputs the L-level signal Sr to the lens MPU 6. On the other hand, the signals (S3a and S3b) are (H,L) or (L,H), the reset IC 7 outputs the H-level signal Sr to the lens MPU 6.

Figure 10:
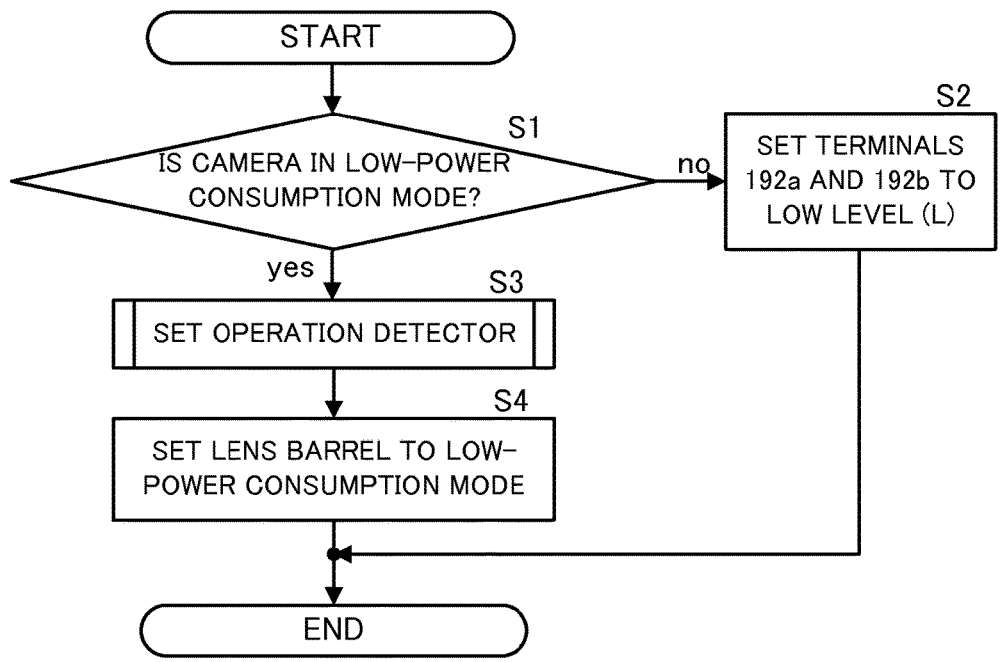
FIG. 10 is a flowchart of illustrating control of a lens MPU in Embodiment 1.

Next, referring to FIG. 10, control after the camera 200 is set to the low-power consumption mode and the lens barrel 300 is changed to the low-power consumption mode until the rotation ring 3 is rotationally operated to return the mode of the camera 200 from the low-power consumption mode will be described. FIG. 10 is a flowchart of illustrating the control by the lens MPU 6 (method of controlling the lens barrel) after the lens barrel 300 recognizes the low-power consumption mode of the camera 200 until the lens barrel 300 is changed to the low-power consumption mode.

First of all, at step S1, the lens MPU 6 determines whether the camera 200 is set to the low-power consumption mode. When the camera 200 is not set to the low-power consumption mode (i.e. the camera 200 is set to the normal shooting mode), the flow proceeds to step S2. At step S2, the lens MPU 6 sets, via its output terminal (OUT terminal), the terminals 192a and 192b of the operation detector 5 to the L level. On the other hand, when the camera 200 is set to the low-power consumption mode at step S1, the flow proceeds to step S3. At step S3, the lens MPU 6 sets the operation detector 5 (performs an operation setting of the operation detector 5). Details of this operation will be described below. Subsequently, at step S4, the lens MPU 6 stops the oscillation of an oscillator and sets the lens barrel 300 to the low-power consumption mode. In this case, the output level at each terminal such as the terminals 192a and 192b is maintained.

Figure 11:
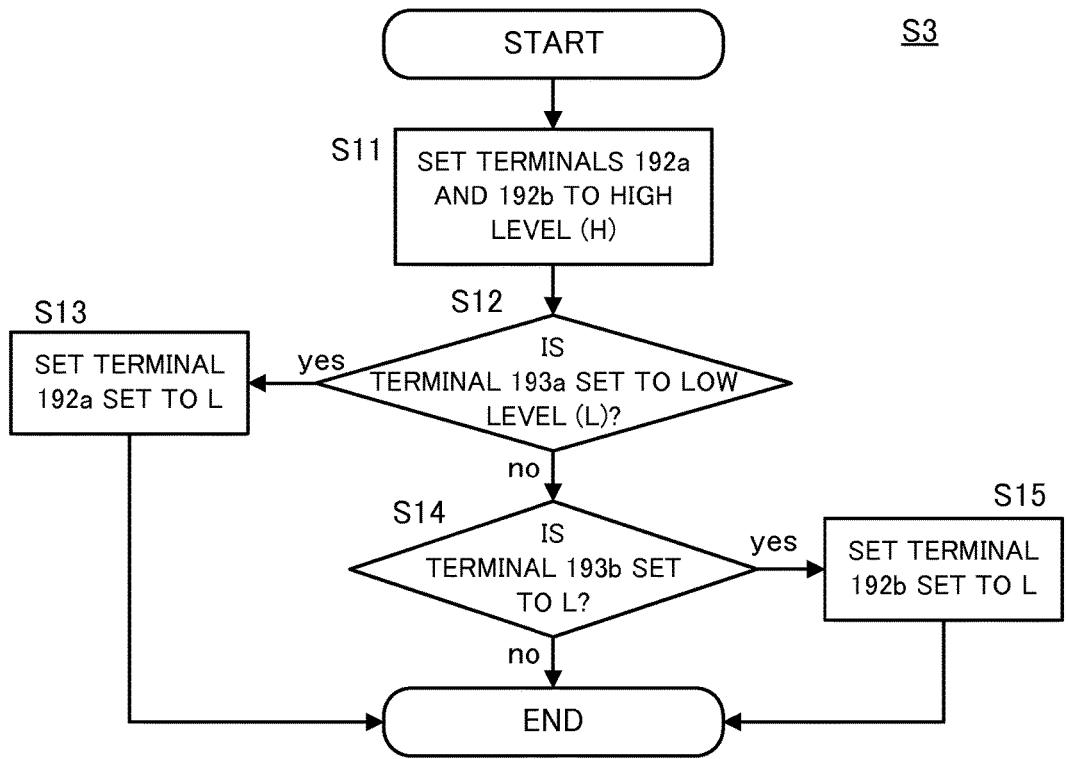
FIG. 11 is a flowchart of illustrating the control of the lens MPU in Embodiment 1.

Next, referring to FIG. 11, control by the lens MPU 6 (step S3 in FIG. 10) after setting the operation detector 5 will be described. FIG. 11 is a flowchart of illustrating the control by the lens MPU 6 (step S3 in FIG. 10) after setting the operation detector 5.

First of all, at step S11, the lens MPU 6 sets, via its output terminal (OUT terminal), the terminals 192a and 192b of the operation detector 5 to the H level. When one of the switches 190a and 190b (micro switches 162a and 162b) of the operation detector 5 is in the ON state, i.e. the state where the power is consumed, the terminal corresponding to the ON-state switch of the terminals 193a and 193b is at the L level.

Subsequently, at step S12, the lens MPU 6 determines whether the terminal 193a is at the L level. When the terminal 193a is at the L level, the lens MPU 6 can recognize the ON state of the switch 190a. When it is determined that the L level is set to the terminal 193a at step S12, the flow proceeds to step S13. At step S13, the lens MPU 6 sets the terminal 192a to the L level. As a result, the signal level set to the terminal 192a at step S11 is changed from the H level to the L level. Then, the flow ends. When the terminal 192a is set to the L level, the state between D-S of the FET 191a becomes the non-conduction state. Therefore, even when the switch 190a is in the ON state, (large amount of) power is not consumed. Since the switch 190b is inevitably in the OFF state when the switch 190a is in the ON state, the power is not consumed unless the operation ring 3 is rotationally operated.

On the other hand, when it is determined that the terminal 193a is not at the L level (i.e. the terminal 193a is at the H level) at step S12, the flow proceeds to step S14. At step S14, the lens MPU 6 determines whether the terminal 193b is at the L level. When the terminal 193b is at the L level, the lens MPU 6 can recognize that the switch 190b is in the ON state. When it is determined that the terminal 193b is at the L level at step S14, the flow proceeds to step S15. At step S15, the lens MPU 6 sets the terminal 192b to the L level. As a result, the signal level set to the terminal 192b at step S11 is changed from the H level to the L level. Then, the flow ends. When the terminal 192b is set to the L level, the state between D-S of the FET 191b becomes the non-conduction state. Therefore, even when the switch 190b is in the ON state, (large amount of) power is not consumed. Since the switch 190a is in the OFF state at step S2, the power is not consumed unless the operation ring 3 is rotationally operated.

On the other hand, when it is determined that the terminal 193b is not at the L level (the terminal 193b is at the H level) at step S14, the flow ends. In this case, since both of the switches 190a and 190b are in the OFF state, the power is not consumed unless the operation ring 3 is rotationally operated.

As described above, even when the lens barrel 300 is set to the low-power consumption mode, the outputs to the terminals 192a and 192b are maintained. Therefore, when the lens barrel 300 is set to the low-power consumption mode, signals (S3a and S3b) output to the terminals 193a and 193b are at high level (H,H) and these signals are output to the reset IC 7. Accordingly, the signal at the input terminal of the lens MPU 6 is at the L level.

When the operation ring 3 is manually rotated, any of the micro switches 162a and 162b (switches 190a and 190b) is pushed by the concave-convex part 122 to become the ON state. Therefore, the signals (S3a and S3b) output to the terminals 193a and 193b are (L,H) or (H,L), and these signals are output to the reset IC 7. When the reset IC 7 receives the signals, the signal at the input terminal of the lens MPU 6 is changed from the L level to the H level. As a result, the lens barrel 300 returns from the low-power consumption mode to the normal shooting mode, and the camera 200 returns from the low-power consumption mode to the normal shooting mode.

As described above, in this embodiment, the operation detector 5 detects the rotational operation of the operation ring 3 by using the mechanical switch unit. This switch unit switches from the OFF state to the ON state based on the displacement generated when the operation ring 3 rotates with respect to the fixed cylinder 9. The switch unit includes the concave-convex part 122 that is provided on the operation ring 3 and the micro switches 162a and 162b that are provided on the fixed cylinder 9. When at least one of the micro switches 162a and 162b is pushed by the concave-convex part 122, the OFF state is switched to the ON state.

In this embodiment, the concave-convex part is provided to push the micro switch in a radial direction, but the embodiment is not limited to this. The concave-convex part may be provided in another direction such as a center axis direction of a cylinder. In this embodiment, the comb teeth part 121 to detect the rotation amount of the rotation ring 3 and the concave-convex part 122 to detect the rotational operation of the rotation ring 3 are separately provided, but the embodiment is not limited to this. A structure (comb teeth part and concave-convex part) that is capable of detecting both of the rotation amount and the rotational operation may be provided to share this structure with the rotation amount detector 4 and the operation detector 5.

[Embodiment 2]

Figure 12:
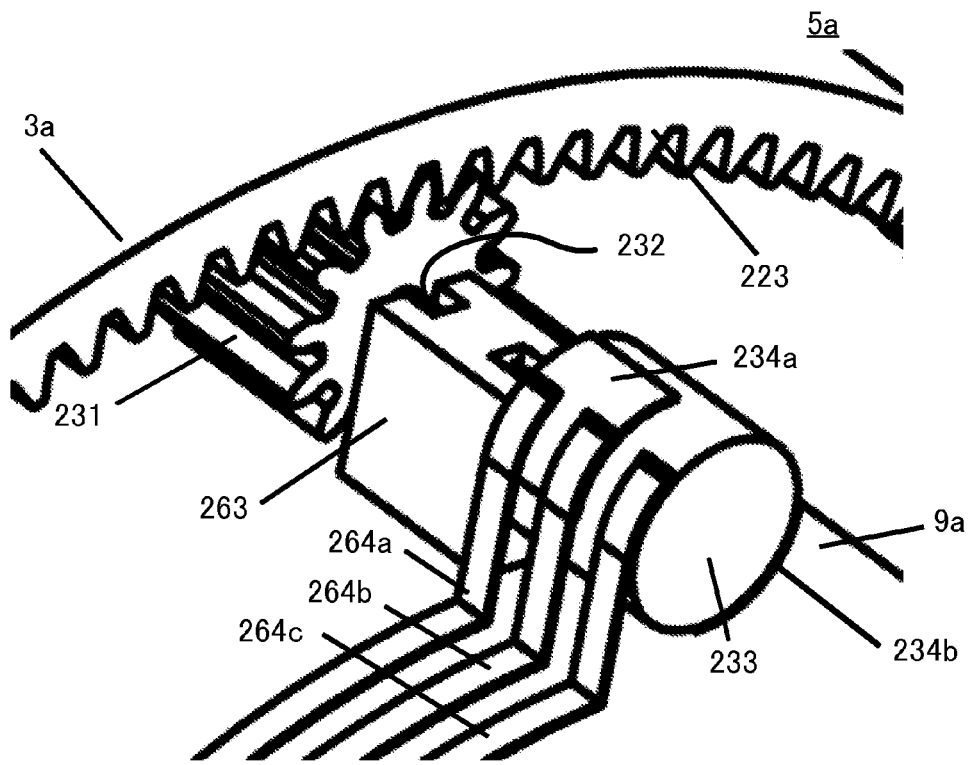
FIG. 12 is a diagram of illustrating a structure of an operation detector in Embodiment 2.
Figure 13:
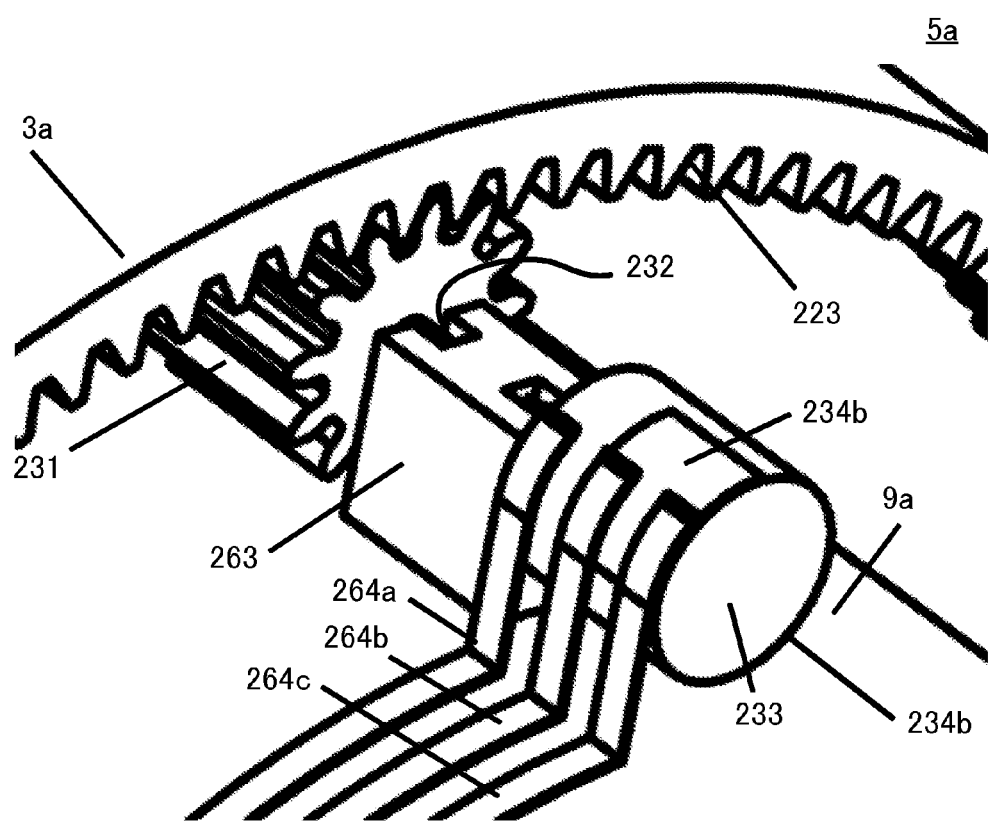
FIG. 13 is a diagram of illustrating a structure of the operation detector in Embodiment 2.

Next, a lens barrel in Embodiment 2 of the present invention will be described. FIGS. 12 and 13 are diagrams of illustrating the structure of an operation detector 5a in this embodiment. FIG. 13 illustrates a state in which a cylinder 233 is rotated by 180 degrees from the state of FIG. 12 (FIGS. 12 and 13 illustrate states in which the positions of the cylinder 233 are different by 180 degrees from each other).

In the operation detector 5a of this embodiment, a gear 223 is provided inside an operation ring 3a. A gear 231 that engages with the gear 223 and a shaft 232 that extends from the gear 231 are fitted into a bearing 263 of a fixed cylinder 9a. A switch unit is provided on the shaft 232 at a side opposite to the gear 231. The switch unit includes a cylinder 233 and electrodes 264a, 264b, and 264c that are disposed to contact a surface of the cylinder 233 and that extend from the fixed cylinder 9a.

Conductive parts 234a and 234b are disposed on the cylinder 233. Each of the conductive parts 234a and 234b is formed to extend across the electrodes 264a and 264b or the electrodes 264b and 264c in a circumferential direction of the cylinder 233 in a strip form. The conductive part 234a that extends across the electrodes 264a and 264b and the conductive part 234b that extends across the electrodes 264b and 264c are alternately disposed so as not to overlap with each other. In this embodiment, as illustrated in FIGS. 12 and 13, the conductive parts 234a and 234b are disposed on the cylinder 233 so as to be different by 180 degrees from each other in the circumferential direction. In this embodiment, the two conductive parts 234a and 234b are used, but the embodiment is not limited to this and the configuration in which three or more conductive parts are provided may be adopted. Since a low resolution of the conductive parts is acceptable compared to the resolution of the rotation amount detector, the conductive part can be easily assembled. A relative angle of the two conductive parts 234a and 234b may be set to an angle different from 180 degrees.

When the operation ring 3a is rotated, the gear 223 rotates. Then, when the gear 223 rotates, the gear 231 that engages with the gear 223 rotates around the shaft 232. According to the rotation of the shaft 232, the cylinder 233 rotates. In addition, according to the rotation of the cylinder 233, the conductive parts 234a and 234b that are formed on the cylinder 233 rotate and the electrodes 264a, 264b, and 264c slide on the cylinder 233.

As illustrated in FIG. 12, when the conductive part 234a is located between the electrodes 264a and 264b, the current flows between the electrodes 264a and 264b. On the other hand, as illustrated in FIG. 13, when the conductive part 234b is located between the electrode 264b and 264c, the current flows between the electrodes 264b and 264c.

Figure 14:
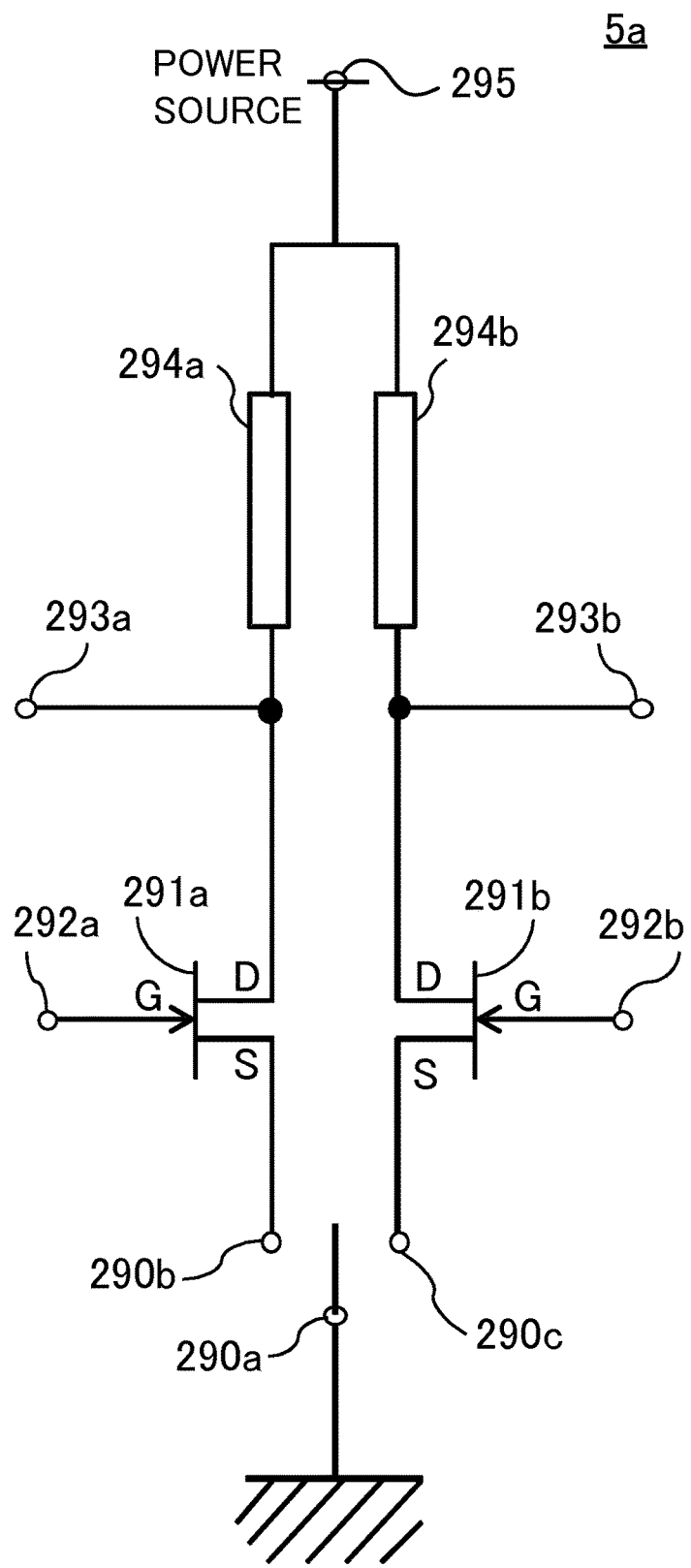
FIG. 14 is an electric circuit diagram of the operation detector in Embodiment 2.

Subsequently, referring to FIG. 14, an electric circuit of the operation detector 5a in this embodiment will be described. FIG. 14 is an electric circuit diagram of the operation detector 5a. The operation detector 5a includes a switch (selector switch) including terminals 290a, 290b, and 290c, field effect transistors (FETs) 291a and 291b, resistors 294a and 294b, and terminals 292a, 292b, 293a, 293b, and 295. The terminals 290a, 290b, and 290c (switch) illustrated in FIG. 14 correspond to the electrodes 264b, 264a, and 264c, respectively, described with reference to FIGS. 12 and 13. The terminals 292a and 292b are connected to an output terminal (OUT terminal) of the lens MPU 6. The terminals 293a and 293b are connected to an input terminal (IN terminal) of the lens MPU 6 and the reset IC 7, respectively. The terminal 295 is connected to a power source.

The electric circuit containing the switch including the terminals 290a and 290b, the FET 291a, the terminals 292a and 293b, and the resistor 294a operates similarly to the electric circuit containing the switch 190a, the FET 191a, the terminals 192a and 193a, and the resistor 194a in Embodiment 1. Furthermore, in this embodiment, the electric circuit containing the terminal 290c, the FET 291b, the terminals 292b and 293b, and the resistor 294b operates similarly to the electric circuit containing the terminal 290b, the FET 291b, the terminals 292a and 293a, and the resistor 294a.

In this circuit configuration, the terminals 290b and 290c of the selector switch can be selectively used. Therefore, when the lens barrel is set to the low-power consumption mode, the switch that does not consume power (switch that requires low-power consumption) can be used. Accordingly, the rotational operation of the operation ring 3a can be detected with low-power consumption. In this embodiment, the reset IC 7 operates similarly to Embodiment 1.

Subsequently, control after the camera 200 is set to the low-power consumption mode and the lens barrel 300 becomes the low-power consumption mode until the rotation ring 3a is rotationally operated to return the camera 200 from the low-power consumption mode will be described. The control of the lens MPU 6 after the lens barrel 300 recognizes the low-power consumption mode of the camera 200 until the lens barrel 300 becomes the low-power consumption mode is similar to Embodiment 1. Furthermore, the setting of the operation detector 5a is controlled similarly to Embodiment 1.

Even when the lens barrel 300 in the low-power consumption mode, the outputs to the terminals 292a and 292b are maintained. Therefore, when the lens barrel 300 is set to the low-power consumption mode, both signals (S3a and S3b) of the terminals 293a and 293b are at the H level (H,H) and these signals are output to the reset IC 7. Accordingly, the signal at the input terminal (IN terminal) of the lens MPU 6 is at the L level.

When the operation ring 3a is manually rotated, the conductive part 234a or 234b contacts between the electrodes 264a and 264b (between the terminals 290b and 290a) or between the electrodes 264b and 264c (between the terminals 290b and 290c). As a result, the power source is turned on, and the signals (S3a and S3b) output to the terminals 293a and 293b are (L,H) or (H,L), and these signals are output to the reset IC 7. When the reset IC 7 receives the signals, the signal at the input terminal (IN terminal) of the lens MPU 6 is changed from the L level to the H level (pulled up). As a result, the lens barrel 300 can return from the low-power consumption mode, and further the camera 200 can return from the low-power consumption mode.

As described above, in this embodiment, the operation detector 5a detects the rotational operation of the operation ring 3a by using the mechanical switch unit. This switch unit switches from the OFF state to the ON state based on the displacement generated when the operation ring 3a rotates with respect to the fixed cylinder 9a. The switch unit includes the gear 223 (first gear) that is provided on the operation ring 3a and the gear 231 (second gear) that is provided on the fixed cylinder 9a and that engages with the gear 223. Furthermore, the switch unit includes the cylinder 233 including the conductive parts 234a and 234b to which power of the gear 231 is transmitted, and the plurality of electrodes 264a, 264b, and 264c that are slidable on the cylinder 233. When the conductive parts 234a and 234b contact two electrodes of the plurality of electrodes 264a, 264b, and 264c, the OFF state is switched to the ON state.

[Embodiment 3]

Figure 15:
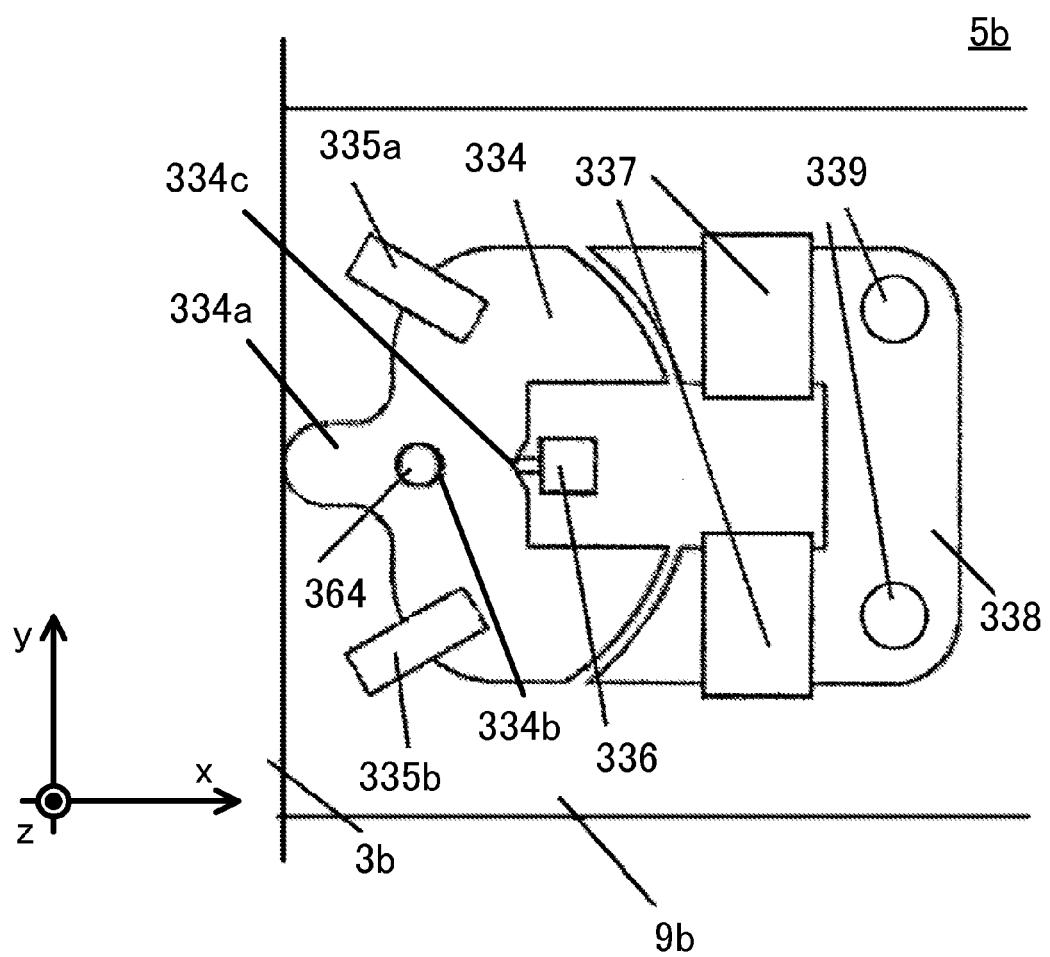
FIG. 15 is a diagram of illustrating a basic state of an operation detector in Embodiment 3.

Next, a lens barrel in Embodiment 3 of the present invention will be described. First of all, referring to FIG. 15, a basic state of an operation detector in this embodiment will be described. FIG. 15 is a diagram of illustrating the basic state of an operation detector 5b in this embodiment.

The operation detector 5b is fixed on a fixed cylinder 9b and is disposed so as to contact an operation ring 3b. The operation detector 5b includes a sensing part 334, tension coil springs 335a and 335b as elastic members, a micro switch 336, a coil 337, a setting part 338, and a screw 339. It is preferable that each of the sensing part 334 and the setting part 338 is made of a ferromagnet such as SUS420J2. The micro switch 336 is normally open.

The setting part 338 has a U-shaped part, and a corner of the setting part 338 is fixed on the fixed cylinder 9b via the screw 339. The coil 337 is wrapped on each of two extending arms of the U-shaped setting part 338. The sensing part 334 has a composite shape that includes a convex part 334a and the U-shaped part opposite to the convex part 334a. In the basic state illustrated in FIG. 15, the convex part 334a of the sensing part 334 contacts the operation ring 3b.

In this embodiment, an axis that is orthogonal to a plane on which the operation ring 3b and the sensing part 334 contact with each other is defined as an x axis. An axis that is orthogonal to the x axis and that is on a plane (in a fixed plane) where the setting part 338 is fixed is defined as a y axis. An axis that is orthogonal to the x axis and the y axis is defined as a z axis. The sensing part 334 is provided with the tension coil springs 335a and 335b at its corners. The tension coil springs 335a and 335b are fixed to the fixed cylinder 9b on the other ends, and are placed such that the sensing part 334 has tension forces to the operation ring 3b in an x axis direction and y axis direction and a tension force to the fixed cylinder 9b in a z axis direction. According to the tension force to the operation ring 3b in the x axis direction, the convex part 334a of the sensing part 334 contacts the operation ring 3b and a friction force is generated. The tension force in the y axis direction is configured to act symmetrically with respect to the tension coil springs 335a and 335b.

An elongate hole 334b is formed on the sensing part 334. The fixed cylinder 9b is provided with a round (cylindrical) protrusion 364. The sensing part 334 is regulated by the protrusion 364 of the fixed cylinder 9b that is fitted into the elongate hole 334b of the sensing part 334.

The tension forces of the tension coil springs 335a and 335b to the fixed cylinder 9b in the z axis direction and the fitting of the protrusion 364 into the elongate hole 334b enable a U-shaped opening of the setting part 338 to face a U-shaped opening of the sensing part 334. Accordingly, both the U-shaped arms can be disposed to face each other in a linear arrangement. Surfaces on which the sensing part 334 and the setting part 338 faces each other have arc shapes around the center of the circle of the protrusion 364 in an xy plane.

The micro switch 336 is provided at the center of the U-shaped opening of the setting part 338 and the U-shaped opening of the sensing part 334 that face each other. The sensing part 334 is provided with a concave part 334c on a side that faces the convex part of the micro switch 336. The micro switch 336 is capable of switching the ON state and the OFF state by pushing the convex part. In the basic state illustrated in FIG. 15, the micro switch 336 is in the OFF state.

Figure 16A:
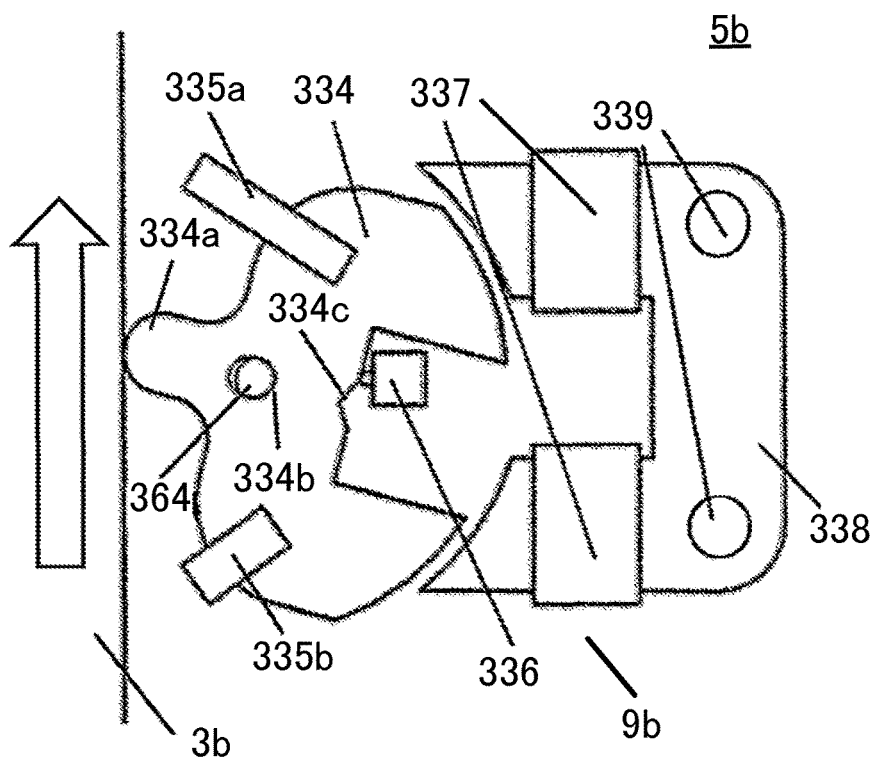
FIGS. 16A and 16B are diagrams of illustrating an ON state of the operation detector in Embodiment 3.
Figure 16B:
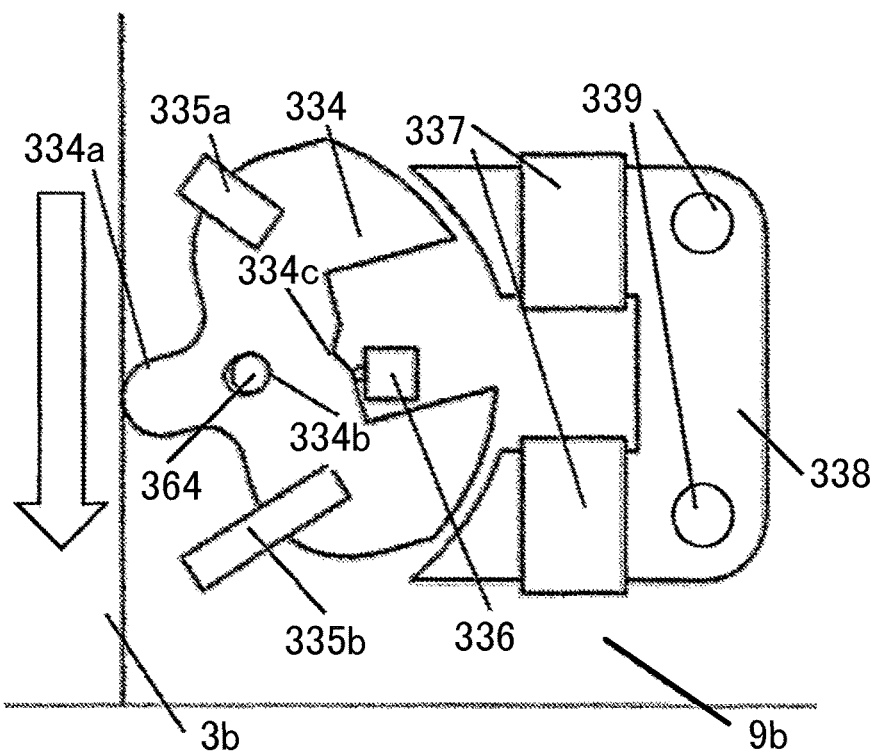

Subsequently, referring to FIGS. 16A and 16B, a case in which the micro switch 336 of the operation detector 5b is changed to the ON state will be described. FIGS. 16A and 16B are diagrams of illustrating the ON state of the operation detector 5b (micro switch 336). FIGS. 16A and 16B illustrate cases where the operation ring 3b is moved (rotated) in an +y direction (upward direction) and in an −y direction (downward direction), respectively.

When the rotation ring 3b is rotationally operated from the basic state illustrated in FIG. 15, the sensing part 334 is biased to the operation ring 3b by the tension coil springs 335a and 335b to generate a friction force. This friction force causes a force that is applied to the sensing part 334 in an operation direction of the y axis direction. In this case, a moving direction of the sensing part 334 is regulated by the protrusion 364 of the fixed cylinder 9b and the elongate hole 334b of the sensing part 334. Therefore, the sensing part 334 is inclined in the y axis direction (operation direction) by using the protrusion 364 as a supporting point. When a surface of the concave part 334c of the sensing part 334 pushes the convex part of the micro switch 336, the micro switch 336 is changed to the ON state.

Figure 17:
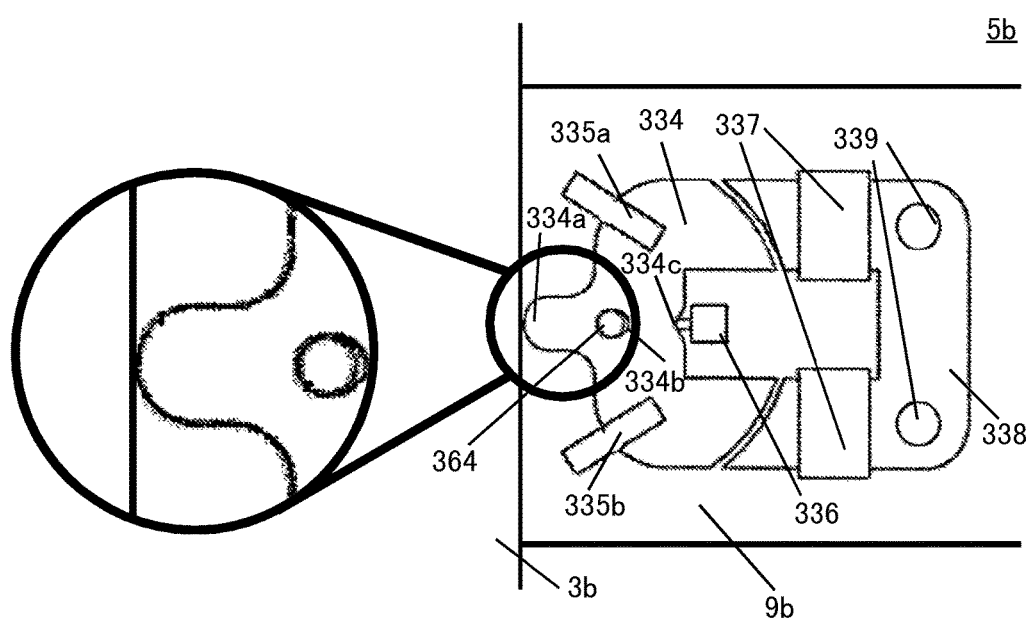
FIG. 17 is a diagram of illustrating a reset operation of the operation detector in Embodiment 3.

Subsequently, it is necessary to reset the operation detector 5b to the basic state in order to change the micro switch 336 to the OFF state. Referring to FIG. 17, a reset operation to reset the operation detector 5b will be described. FIG. 17 is a diagram of illustrating the reset operation of the operation detector 5b, and illustrates the state of the operation detector 5b when the current flows in the coil 337. When the current flows in the coil 337, the sensing part 334 and the setting part 338 form a magnetic circuit to generate a magnetic force in the setting part 338.

The setting part 338 is fixed on the fixed cylinder 9b via the screws 339. Therefore, according to the magnetic force that is generated by flowing current in the coil 337, the sensing part 334 receives an attractive force to the setting part 338. In this case, the attractive force that is generated by flowing the current in the coil 337 and that acts on the sensing part 334 is greater than the tension forces of the tension coil springs 335a and 335b to the operation ring 3b in the x axis direction. Therefore, when the current flows in the coil 337, the sensing part 334 moves away from the operation ring 3b. When the sensing part 334 moves away from the operation ring 3b, the convex part 334a of the sensing part 334 remains at a position that is parallel to the x axis by balancing the tension forces of the tension coil springs 335a and 335b in the y axis direction. When flowing the current in the coil 337 is stopped in this state, the magnetic force that is generated in the setting part 338 disappears and the operation detector 5b is reset to the basic state by the tension forces of the tension coil springs 335a and 335b (elastic members) to the operation ring 3b in the x axis direction. When the operation detector 5b is reset to the basic state, the micro switch 336 is changed to the OFF state.

Figure 18:
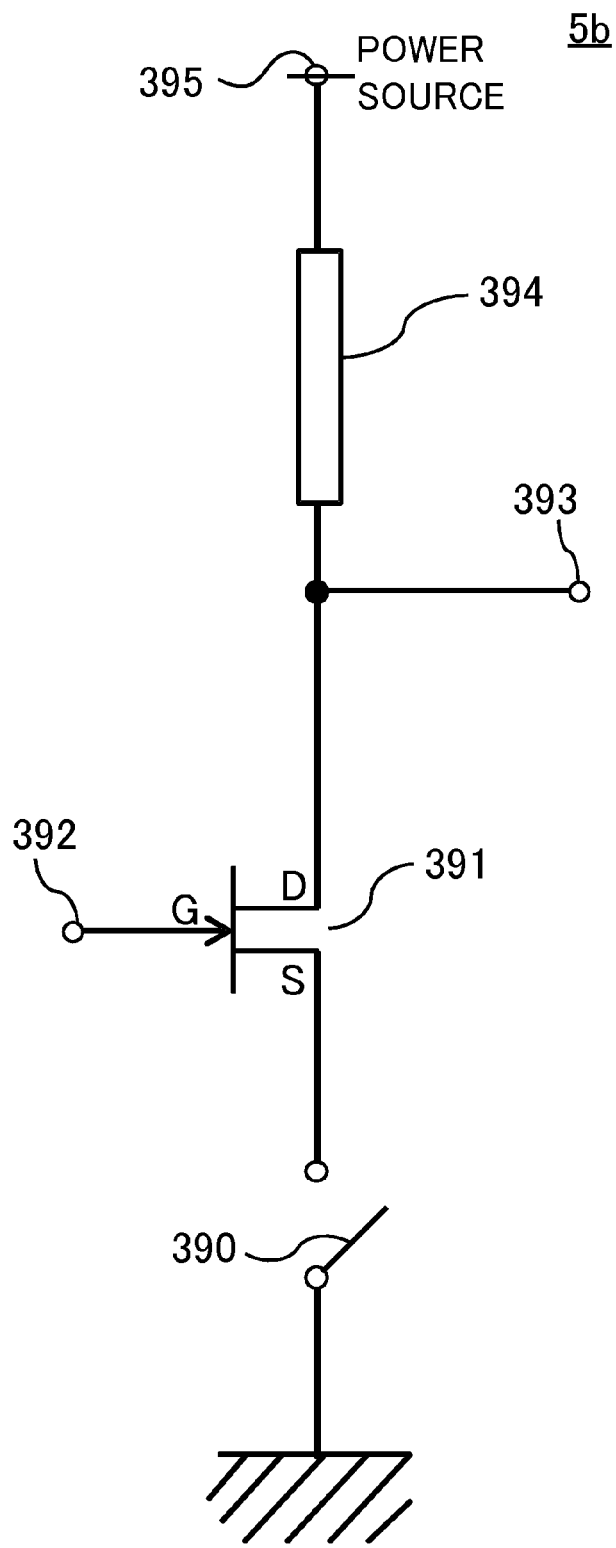
FIG. 18 is an electric circuit diagram of the operation detector in Embodiment 3.

FIG. 18 is an electric circuit diagram of the operation detector 5b. This electric circuit includes a switch 390, a field effect transistor (FET) 391, a resistor 394, and terminals 392, 393, and 395. The switch 390 corresponds to the micro switch 336 in FIGS. 15 to 17. The terminal 392 is connected to an output terminal (OUT terminal) of the lens MPU 6. The terminal 393 is connected to an input terminal (IN terminal) of the lens MPU 6. The terminal 395 is connected to a power source. The electric circuit including the switch 390, the FET 391, the terminals 392 and 393, and the resistor 394 in this embodiment operates similarly to the electric circuit including the switch 190a, the FET 191a, the terminals 192a and 193a, and the resistor 194a in Embodiment 1.

In this configuration, the ON state or the OFF state of the switch 390 can be detected. When the terminal 392 is set to the L level, the state between D-S of the FET 391 becomes the non-conduction state. When the switch 390 is in the OFF state in this case, power is not consumed. In the electric circuit of FIG. 18, the current flows only when the switch 390 is in the ON state. When the current flows, a signal of the terminal 393 (IN terminal of the lens MPU 6) is changed from the H level to the L level.

Figure 19:
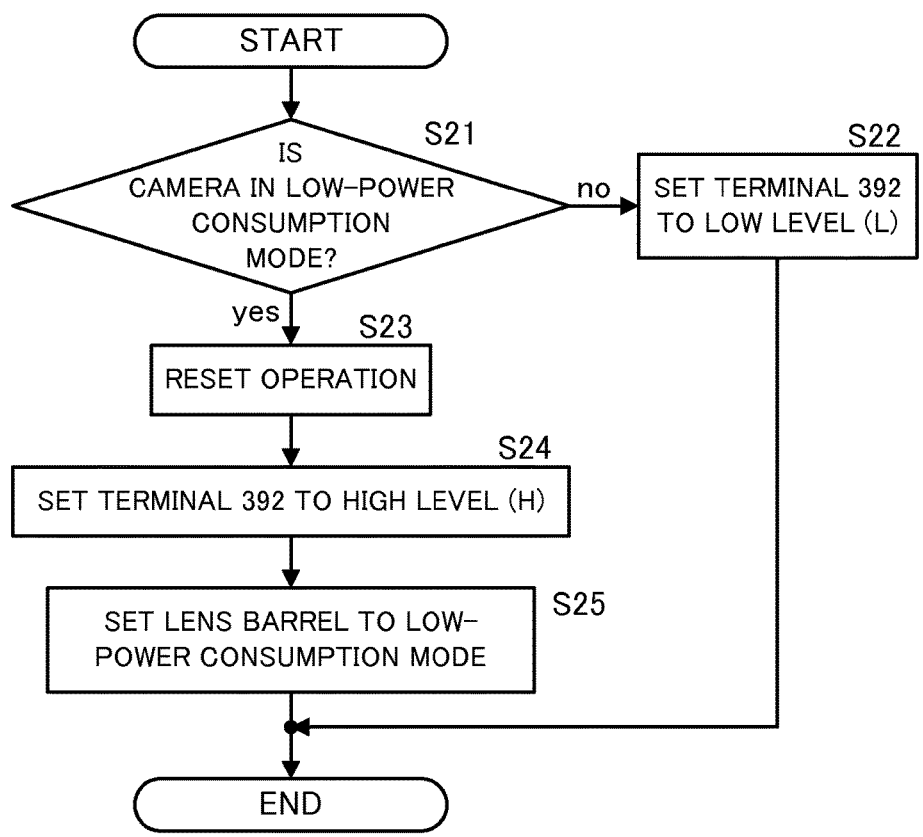
FIG. 19 is a flowchart of illustrating control of a lens MPU in Embodiment 3.

Subsequently, referring to FIG. 19, control after the camera 200 is set to the low-power consumption mode and the lens barrel 300 becomes the low-power consumption mode until the rotation ring 3b is rotationally operated to return (change) the camera 200 from the low-power consumption mode to the normal shooting mode will be described. FIG. 19 is a flowchart of illustrating the control by the lens MPU 6 (method of controlling the lens barrel) after the lens barrel 300 recognizes the low-power consumption mode of the camera 200 until the lens barrel 300 is set to the low-power consumption mode.

First of all, at step S21, the lens MPU 6 determines whether the camera 200 is set to the low-power consumption mode. When the camera 200 is not set to the low-power consumption mode (i.e. the camera 200 is set to the normal shooting mode), the flow proceeds to step S22. At step S22, the lens MPU 6 sets, via the output terminal (OUT terminal), the terminal 392 of the operation detector 5b to the L level. Accordingly, the power consumption can be reduced in the normal shooting mode. On the other hand, when the camera 200 is set to the low-power consumption mode at step S21, the flow proceeds to step S23. At step S23, the lens MPU 6 performs a reset operation of the operation detector 5b. According to this reset operation, the switch 390 is changed to the OFF state to be able to detect the rotational operation by the operation detector 5b without consuming the power. Subsequently, at step S24, the lens MPU 6 outputs the H-level signal to the terminal 392. Subsequently, at step S25, the lens MPU 6 stops the oscillation of the oscillator and sets the lens barrel 300 to the low-power consumption mode. In this time, the output level at the terminal 392 is maintained.

When the operation ring 3b is manually rotated, the micro switch 336 (switch 390) is changed to the ON state and the signal input to the input terminal (IN terminal) of the lens MPU 6 is changed from the H level to the L level. Accordingly, the lens barrel 300 returns from the low-power consumption mode to the normal shooting mode, and further the camera 200 returns from the low-power consumption mode to the normal shooting mode.

Thus, in this embodiment, the operation detector 5b detects the rotational operation of the operation ring 3b by using the mechanical switch unit. This switch unit switches from the OFF state to the ON state based on the displacement generated when the operation ring 3b rotates with respect to the fixed cylinder 9b. The switch unit includes the sensing part 334 that displaces by using the protrusion 364 of the fixed cylinder 9b as a supporting point depending on the rotation of the operation ring 3b, and the elastic members (tension coil springs 335a and 335b) that apply the tension forces between the fixed cylinder 9b and the sensing part 334. The switch unit also includes the micro switch 336 that is provided on the fixed cylinder 9b. When the micro switch 336 is pushed by the sensing part 334, the OFF state is switched to the ON state.

As described above, in each embodiment, a lens barrel 300 includes a rotation amount detector 4 that detects a rotation amount of an operation member (one of operation rings 3, 3a and 3b) and an operation detector (one of operation detectors 5, 5a, and 5b) that detects a rotational operation of the operation member. The operation detector has a mechanism that is different from that of the rotation amount detector. A controller (lens MPU 6) is capable of setting a first mode and a second mode in which power consumption is lower than that in the first mode. The rotation amount detector operates in the first mode and the operation detector operates in the second mode. In other words, the controller is capable of operating the lens barrel in the first mode in which the rotation amount detector is used and the second mode in which the operation detector is used, and power consumption required in the second mode is less than power consumption required in the first mode. Preferably, the operation detector detects, as the rotational operation of the operation member, a start of rotation of the operation member in a state where the second mode is set. Preferably, the operation detector does not operate in the first mode.

Preferably, the controller changes the second mode to the first mode when receiving a predetermined signal (L-level or H-level signal) from the operation detector in a state where the second mode is set. More preferably, the first mode is a shooting mode in which the lens is capable of driving, and the second mode is a standby mode (low-power consumption mode).

Preferably, the rotation amount detector 4 detects the rotation amount of the operation member by using a photosensor (photo interrupters 161a and 161b). The operation detector detects the rotational operation of the operation member by using a mechanical switch unit. More preferably, the lens barrel 300 includes a fixed member (one of fixed cylinders 9, 9a, and 9b). The operation member is rotatable around an optical axis of the lens with respect to the fixed member. The switch unit switches from an OFF state to an ON state based on a displacement that is generated when the operation member rotates with respect to the fixed member.

Preferably, the controller changes the second mode to the first mode when the switch unit switches from the OFF state to the ON state. Preferably, the controller changes the first mode to the second mode based on a received signal (first communication signal) from a camera 200. Preferably, the controller sends change information (second communication signal) to the camera 200 when changing the second mode to the first mode.

According to each embodiment, a lens barrel and a camera system that are capable of detecting a rotational operation of an operation ring in a low-power consumption mode can be provided. Therefore, when a camera is set to the low-power consumption mode, the lens barrel and the camera can return from the low-power consumption mode to the normal shooting mode by manually operating the operation ring of the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in each embodiment, the rotation amount detector and the operation detector are provided on the fixed cylinder and the operation ring, but the embodiment is not limited to this. The rotation amount detector and the operation detector may be provided on an irrotational member (member other than the fixed cylinder) and the operation ring. In each embodiment, the photo interrupter is used as the rotation amount detector, and another member such as a reflective photosensor may be used. In addition, the rotation amount detector is not limited to the photo sensor, and a vertical analog encoder that uses a variable resistor or an encoder that detects the rotation amount according to magnetism can also be used. In each embodiment, the lens barrel is an interchangeable lens that is removably attached to the camera, and an image pickup apparatus that includes the camera and the lens barrel integrated with each other can also be applied to each embodiment. In this case, each of the processes by the lens MPU 6 described above can be performed by the camera MPU 8.

According to each of embodiments described above, a lens barrel and a camera system that are capable of detecting a rotational operation of a rotation ring in a low-power consumption mode can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-029467, filed on Feb. 19, 2014, which is hereby incorporated by reference wherein in its entirety.

What is claimed is:

1. A lens barrel comprising:
   a lens;
   a rotatable operation member;
   a rotation amount detector configured to detect a rotation amount of the operation member;
   an operation detector configured to detect a rotational operation of the operation member, the operation detector having a mechanism that is different from a mechanism of the rotation amount detector; and
   a controller configured to perform drive control of the lens depending on rotation of the operation member,
   wherein the controller is configured to operate the lens barrel in a first mode in which the rotation amount detector is used to detect the rotation amount of the operation member and is configured to operate the lens barrel in a second mode in which the operation detector is used to detect the rotational operation of the operation member, and power consumption required in the second mode is less than power consumption required in the first mode.

2. The lens barrel according to claim 1, wherein the controller changes the second mode to the first mode when receiving a predetermined signal from the operation detector in a state where the second mode is set.

3. The lens barrel according to claim 1, wherein the first mode is a shooting mode in which the lens is configured to be driven, and the second mode is a standby mode.

4. The lens barrel according to claim 1, wherein the operation detector does not operate in the first mode.

5. The lens barrel according to claim 1, wherein the operation detector detects, as the rotational operation of the operation member, a start of rotation of the operation member in a state where the second mode is set.

6. The lens barrel according to claim 1, wherein:
   the rotation amount detector detects the rotation amount of the operation member by using a photosensor, and
   the operation detector detects the rotational operation of the operation member by using a switch unit.

7. The lens barrel according to claim 6, further comprising a fixed member, wherein:
   the operation member is rotatable around an optical axis of the lens with respect to the fixed member, and
   the switch unit switches from an OFF state to an ON state based on a displacement that is generated when the operation member rotates with respect to the fixed member.

8. The lens barrel according to claim 7, wherein:
   the switch unit includes
   a concave-convex part that is provided on the operation member, and
   a micro switch that is provided on the fixed member, and
   the switch unit switches from the OFF state to the ON state when the micro switch is pushed by the concave-convex part.

9. The lens barrel according to claim 7, wherein:
   the switch unit includes
   a first gear that is provided on the operation member, a second gear that is provided on the fixed member and that engages with the first gear, a cylinder to which power of the second gear is transmitted, and the cylinder including a conductive part, and an electrode that is slidable on the cylinder, the switch unit switches from the OFF state to the ON state when the conductive part contacts with the electrode.

10. The lens barrel according to claim 7, wherein:

the switch unit includes a sensing part that is displaced depending on rotation of the operation member by using a protrusion of the fixed member as a supporting point, an elastic member that applies a tension between the fixed member and the sensing part, and a micro switch that is provided on the fixed member, the switch unit switches from the OFF state to the ON state when the micro switch is pushed by the sensing part.

11. The lens barrel according to claim 7, wherein the controller changes the second mode to the first mode when the switch unit switches from the OFF state to the ON state.

12. The lens barrel according to claim 1, wherein the controller changes the first mode to the second mode based on a received signal from a camera.

13. The lens barrel according to claim 1, wherein the controller sends change information to a camera when changing the second mode to the first mode.

14. The lens barrel according to claim 1, wherein the operation detector has a physical mechanism that is different from a physical mechanism of the rotation amount detector.

15. The lens barrel according to claim 1, wherein the operation detector detects the rotational operation of the operation member by using a switch unit including:

a first gear that is provided on the operation member, a second gear that is provided on a fixed member and that engages with the first gear, a cylinder to which power of the second gear is transmitted, and the cylinder including a conductive part, and an electrode that is slidable on the cylinder, and wherein the switch unit switches from the OFF state to the ON state when the conductive part contacts with the electrode.

16. The lens barrel according to claim 1, wherein the rotation amount detector is a member different from the operation detector.

17. A camera system comprising:

a lens barrel comprising:

a lens;

a rotatable operation member;

a rotation amount detector configured to detect a rotation amount of the operation member;

an operation detector configured to detect a rotational operation of the operation member, the operation detector having a mechanism that is different from a mechanism of the rotation amount detector; and a controller configured to perform drive control of the lens depending on rotation of the operation member, wherein the controller is configured to operate the lens barrel in a first mode in which the rotation amount detector is used to detect the rotation amount of the operation member and is configured to operate the lens barrel in a second mode in which the operation detector is used to detect the rotational operation of the operation member, and power consumption required in the second mode is less than power consumption required in the first mode, and a camera including an image pickup element.

* * * * *